US012638062B2

(12) United States Patent
Carroccia et al.

(10) Patent No.: US 12,638,062 B2
(45) Date of Patent: *May 26, 2026

(54) FORCE DAMPER

(71) Applicant: On Top Safety, Inc., Cheektowaga, NY (US)

(72) Inventors: John J. Carroccia, Orchard Park, NY (US); Jeffery L. Murray, Hamburg, NY (US)

(73) Assignee: On Top Safety Equipment, LLC, Cheektowaga, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,618

(22) Filed: Aug. 27, 2018

(65) Prior Publication Data

US 2019/0195310 A1    Jun. 27, 2019

Related U.S. Application Data

(60) Provisional application No. 62/610,786, filed on Dec. 27, 2017.

(51) Int. Cl.
F16F 13/00 (2006.01)
A62B 35/04 (2006.01)
(Continued)

(52) U.S. Cl.
CPC ............ F16F 13/005 (2013.01); A62B 35/04 (2013.01); F16F 7/003 (2013.01); F16F 7/12 (2013.01);
(Continued)

(58) Field of Classification Search
CPC .......... F16F 13/005; F16F 13/04; F16F 7/003; F16F 7/12; F16F 2224/0208;
(Continued)

(56) References Cited

U.S. PATENT DOCUMENTS 2,421,822 A * 6/1947 Wood ........................ F16L 3/18
248/562
2,678,796 A * 5/1954 Roy .......................... F16F 3/10
267/152
(Continued)

FOREIGN PATENT DOCUMENTS

DE      202008002704      5/2008

OTHER PUBLICATIONS

Model No. 1340101 PROTM Stretch Shock Absorbing Lanyard manufactured by Protecta®, 3M Protecta Catalog Rev E, Fall 2016.

*Primary Examiner* — Colleen M Chavchavadze
*Assistant Examiner* — Shiref M Mekhaeil
(74) *Attorney, Agent, or Firm* — Simpson & Simpson, PLLC

(57) ABSTRACT

A force damper arranged to progressively arrest a first force imparted by an object moving in a first direction, the force damper including a housing, a driving member and first and second resilient members. The housing includes a first end and a second end, the first end having a first surface, a second surface opposite the first surface and a first connection point secured to the first surface, and the second end having a through bore and a third surface opposingly disposed relative to the second surface. The driving member includes a first end, a second end and a shaft therebetween, the first end having a stop and the second end having a second connection point. At least one of the first and second resilient members is formed from a material that at least partially undergoes plastic deformation when the first force is arrested. The first and second resilient members are disposed between the stop and the third surface and impart a second force on the stop toward the second surface.

7 Claims, 11 Drawing Sheets

(51) Int. Cl.
*F16F 7/00* (2006.01)
*F16F 7/12* (2006.01)
*F16F 13/04* (2006.01)

(52) U.S. Cl.
CPC ...... *F16F 13/04* (2013.01); *F16F 2224/0208* (2013.01); *F16F 2224/0233* (2013.01); *F16F 2228/14* (2013.01); *F16F 2230/0047* (2013.01); *F16F 2232/08* (2013.01)

(58) Field of Classification Search
CPC ....... F16F 2224/0233; F16F 2224/0225; F16F 2224/025; F16F 2228/14; F16F 2230/0047; F16F 2232/08; A62B 35/04; A62B 35/0068
See application file for complete search history.

(56) References Cited

U.S. PATENT DOCUMENTS

| | | | | | |
|---|---|---|---|---|---|
| 3,462,137 | A | * | 8/1969 | Grube | B60P 7/0823 |
| | | | | | 410/41 |
| 3,610,606 | A | * | 10/1971 | Andrews | F16F 15/04 |
| | | | | | 269/162 |
| 3,637,174 | A | * | 1/1972 | Kuo | C10G 9/20 |
| | | | | | 188/1.11 R |
| 4,154,140 | A | * | 5/1979 | Zeilon | F16B 13/025 |
| | | | | | 411/16 |
| 4,256,292 | A | * | 3/1981 | Sullivan, Jr. | B60G 13/003 |
| | | | | | 188/268 |
| 4,601,367 | A | * | 7/1986 | Bongers | B29D 28/005 |
| | | | | | 293/133 |
| 4,624,493 | A | * | 11/1986 | Hillebrand | B60R 19/34 |
| | | | | | 267/140 |
| 4,976,443 | A | * | 12/1990 | DeLucia | F42B 6/08 |
| | | | | | 473/583 |
| 5,240,232 | A | * | 8/1993 | Loziuk | F16F 7/14 |
| | | | | | 267/136 |
| 5,332,071 | A | * | 7/1994 | Duncan | E04G 21/3295 |
| | | | | | 267/74 |
| 5,358,068 | A | * | 10/1994 | Whitmer | E04G 21/3204 |
| | | | | | 182/113 |
| 5,458,214 | A | * | 10/1995 | Olson | F16F 7/00 |
| | | | | | 182/18 |
| 5,468,019 | A | * | 11/1995 | Blase | B60R 22/4619 |
| | | | | | 297/480 |
| 5,799,760 | A | * | 9/1998 | Small | A62B 35/04 |
| | | | | | 267/155 |
| 6,471,198 | B2 | * | 10/2002 | Herbst | F16F 1/40 |
| | | | | | 267/293 |
| 6,485,411 | B1 | * | 11/2002 | Konstorum | A61B 1/00078 |
| | | | | | 604/527 |
| 6,854,574 | B2 | * | 2/2005 | Yoshida | B60R 19/34 |
| | | | | | 293/133 |
| 7,530,334 | B1 | * | 5/2009 | Napolitano | A01K 27/005 |
| | | | | | 119/769 |
| 7,579,550 | B2 | * | 8/2009 | Dayton | A61B 1/0055 |
| | | | | | 174/108 |
| 8,182,023 | B2 | * | 5/2012 | Nagwanshi | B60R 19/18 |
| | | | | | 296/187.09 |
| 8,608,142 | B2 | * | 12/2013 | Von Allmen | F16F 7/128 |
| | | | | | 267/170 |
| 8,820,493 | B2 | * | 9/2014 | Parida | F16F 9/303 |
| | | | | | 188/374 |
| 9,080,823 | B1 | * | 7/2015 | Mantas | F41A 3/84 |
| 9,422,999 | B2 | * | 8/2016 | Hermann | F16F 13/1409 |
| 10,663,110 | B1 | * | 5/2020 | Rawas | B33Y 50/02 |
| 11,293,509 | B2 | * | 4/2022 | Muraguchi | F16F 1/127 |
| 2002/0165532 | A1 | * | 11/2002 | Hill, III | A61B 18/1492 |
| | | | | | 606/41 |
| 2002/0177906 | A1 | * | 11/2002 | Phillips | A61F 2/60 |
| | | | | | 623/27 |
| 2004/0079855 | A1 | * | 4/2004 | Strabel, III | H01L 21/67196 |
| | | | | | 248/650 |
| 2004/0145098 | A1 | * | 7/2004 | Thaler | F16F 1/445 |
| | | | | | 267/33 |
| 2006/0289708 | A1 | * | 12/2006 | Lin | B60R 11/00 |
| | | | | | 248/160 |
| 2009/0107781 | A1 | * | 4/2009 | Fritz | F16F 9/585 |
| | | | | | 188/280 |
| 2010/0000504 | A1 | * | 1/2010 | Trpkovski | F41B 5/0094 |
| | | | | | 124/25.6 |
| 2011/0114427 | A1 | * | 5/2011 | Parida | F16F 9/303 |
| | | | | | 29/428 |
| 2011/0227353 | A1 | * | 9/2011 | Nagwanshi | F16F 1/04 |
| | | | | | 293/137 |
| 2011/0233975 | A1 | * | 9/2011 | Mindel | B64D 11/0689 |
| | | | | | 188/371 |
| 2012/0186436 | A1 | * | 7/2012 | Parida | B61G 11/12 |
| | | | | | 89/930 |
| 2012/0193165 | A1 | * | 8/2012 | Vetesnik | F16F 7/125 |
| | | | | | 188/65.1 |
| 2012/0264523 | A1 | * | 10/2012 | Liebing | A61M 60/414 |
| | | | | | 464/60 |
| 2013/0312650 | A1 | * | 11/2013 | Smith | A46B 5/005 |
| | | | | | 114/222 |
| 2014/0240890 | A1 | * | 8/2014 | Bradshaw | A01M 29/24 |
| | | | | | 361/232 |
| 2014/0332645 | A1 | * | 11/2014 | Brooks | A01M 31/06 |
| | | | | | 248/156 |
| 2016/0199678 | A1 | * | 7/2016 | Tsai | C08G 18/6674 |
| | | | | | 248/636 |
| 2016/0363186 | A1 | * | 12/2016 | McCoy | F16F 7/09 |
| 2017/0128756 | A1 | * | 5/2017 | Schurian | A62B 35/04 |
| 2017/0232280 | A1 | * | 8/2017 | Carroccia | A62B 35/04 |
| | | | | | 182/3 |
| 2017/0247894 | A1 | * | 8/2017 | Sargent | A62B 35/04 |
| 2018/0209504 | A1 | * | 7/2018 | Kim | F16F 3/04 |
| 2018/0264297 | A1 | * | 9/2018 | Poldmaa | A62B 35/0068 |
| 2018/0323489 | A1 | * | 11/2018 | Vermillion, Jr. | B64C 1/08 |
| 2019/0176733 | A1 | * | 6/2019 | Abushawashi | B62D 21/157 |
| 2019/0234480 | A1 | * | 8/2019 | Bu | F16F 15/022 |
| 2019/0301662 | A1 | * | 10/2019 | Brooks | A01K 39/01 |
| 2019/0337046 | A1 | * | 11/2019 | Sugita | B21F 3/06 |
| 2020/0070870 | A1 | * | 3/2020 | Terada | F16F 7/126 |
| 2021/0144916 | A1 | * | 5/2021 | Farley | A01D 41/06 |
| 2021/0190164 | A1 | * | 6/2021 | Muraguchi | F16F 1/127 |

* cited by examiner

118

100

FORCE DAMPER

CROSS-REFERENCE TO RELATED APPLICATIONS

This patent application claims the benefit under 35 U.S.C. § 119(e) of U.S. Provisional Patent Application No. 62/610,786, filed Dec. 27, 2017, which application is incorporated herein by reference.

FIELD

The invention broadly relates to a force damper, more specifically to a force damper used as a fall mitigation device, and even more particularly to a force damper used as a fall mitigation device having a single use, collapsible resilient member arranged to prevent reuse of the force damper after arresting a falling object, e.g., a roofing construction worker.

BACKGROUND

Fall prevention and fall arrest systems are known in the art. For example, one such system includes a stretchable shock absorbing lanyard, e.g., Model No. 1340101 PRO™ Stretch Shock Absorbing Lanyard manufactured by Protecta®. The inner core of the device extends from about four and a half feet to about six feet while absorbing energy of a falling object. Although this device may be suitable in some situations, it cannot ensure safety in situations where the falling height is similar to the height of the object falling, e.g., a worker that is six feet falling off an elevated level of seven feet. However, heretofore, such damper devices were arranged to be reused over and over again.

Regulations and/or a desire to ensure worker safety have created a need for force damping systems that cannot be used more than a single time as the integrity of a previously used force damper cannot be verified. For example, a force damper used to slow the fall of a three hundred pound object may not perform effectively while slowing the fall of a three hundred pound object a second time, while the same force damper may perform repeatably when slowing the fall of a one hundred fifty pound object. Thus, there is a long-felt need for a force damper that is easy to operate, inexpensive to build, safe for its intended use and that precludes subsequent uses.

SUMMARY

The present invention broadly comprises a force damper arranged to progressively arrest a first force imparted by an object moving in a first direction, the force damper including a housing, a driving member and a resilient member. The housing includes a first end and a second end, the first end having a first surface, a second surface opposite the first surface and a first connection point secured to the first surface, and the second end having a through bore and a third surface oppiosingly disposed relative to the second surface. The driving member includes a first end, a second end and a shaft therebetween, the first end comprises a stop and the second end comprises a second connection point. The resilient member is formed from a material that at least partially undergoes plastic deformation when the first force is arrested. The resilient member is disposed between the stop and the third surface and imparts a second force on the stop toward the second surface.

The present invention also broadly comprises a force damper arranged to progressively arrest a first force imparted by an object moving in a first direction, the force damper including a housing, a driving member and first and second resilient members. The housing includes a first end and a second end, the first end having a first surface, a second surface opposite the first surface and a first connection point secured to the first surface, and the second end having a through bore and a third surface oppisingly disposed relative to the second surface. The driving member includes a first end, a second end and a shaft therebetween, the first end having a stop and the second end having a second connection point. At least one of the first and second resilient members is formed from a material that at least partially undergoes plastic deformation when the first force is arrested. The first and second resilient members are disposed between the stop and the third surface and impart a second force on the stop toward the second surface.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

Figures 1A, 1B:
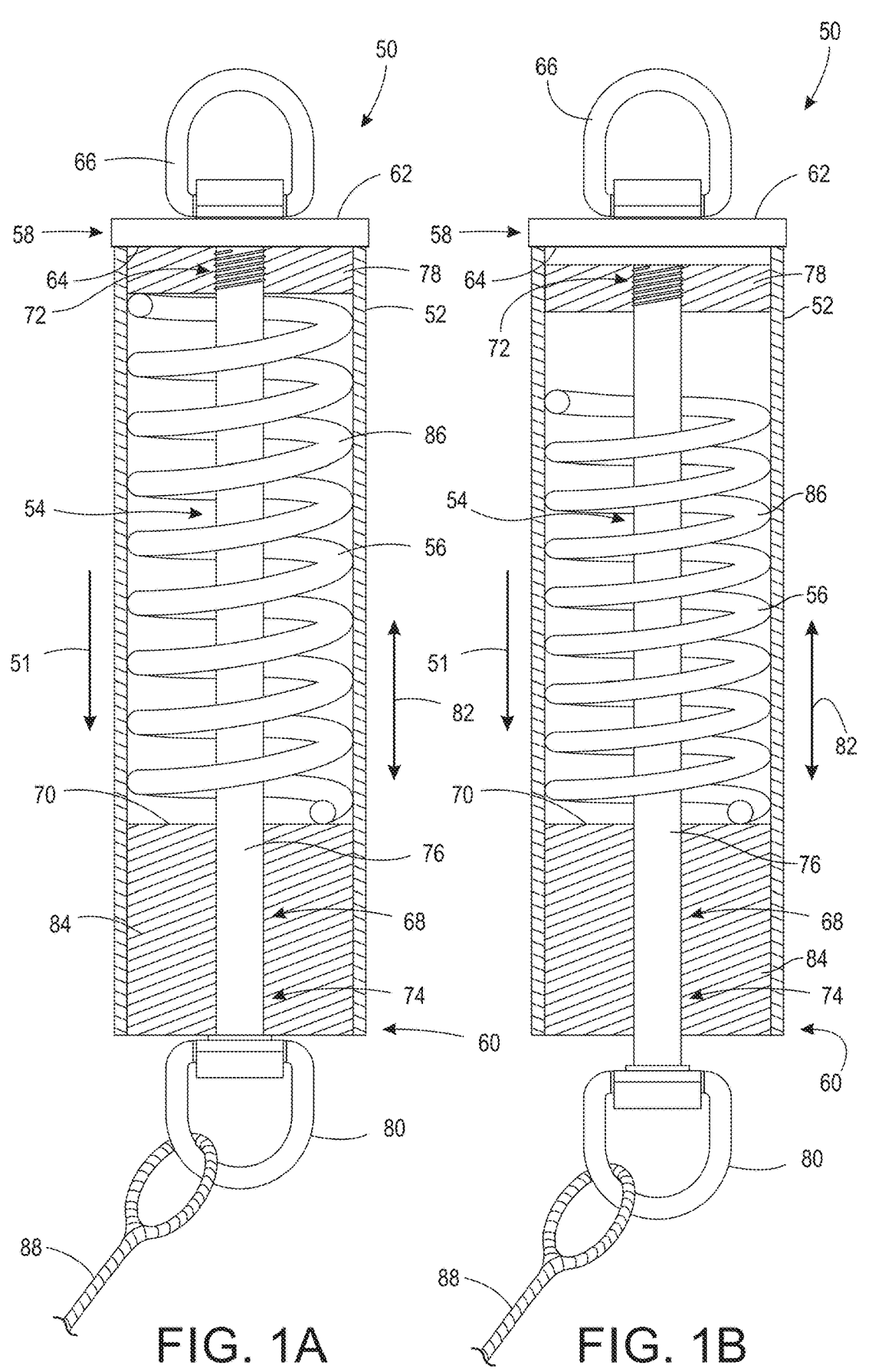
FIG. 1A is a side cross sectional view of an embodiment of a present force damper prior to the application of a first force.
FIG. 1B is a side cross sectional view of an embodiment of a present force damper subsequent to the application of a first force.
Figure 2:
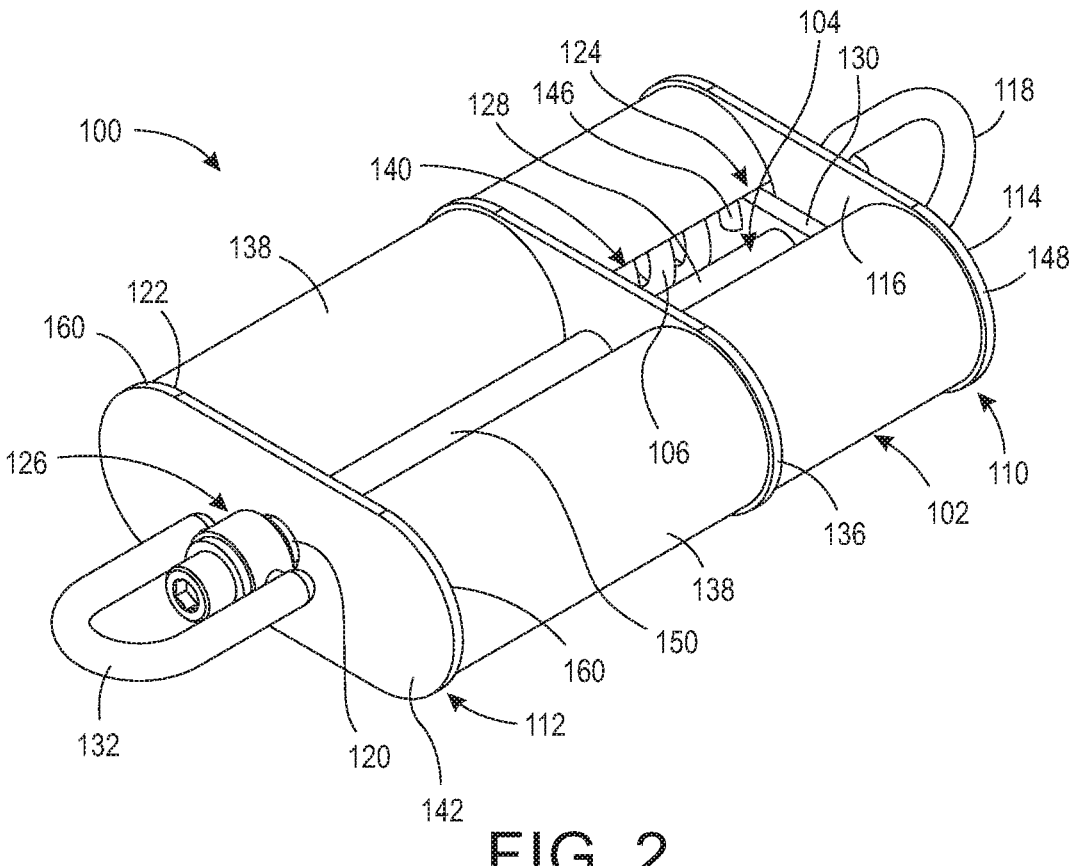
FIG. 2 is a top perspective view of an embodiment of a present force damper.
Figure 3:
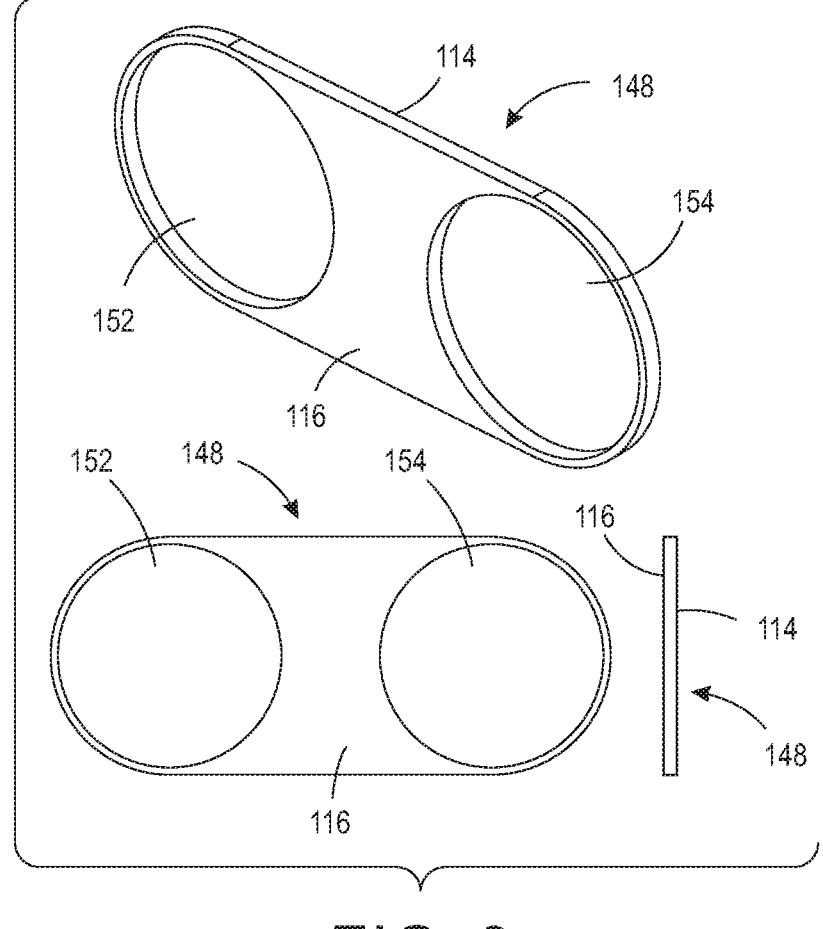
FIG. 3 is a front perspective, a side elevational and a front elevational view of an embodiment of a plate included in some embodiments of a present force damper.
Figure 4:
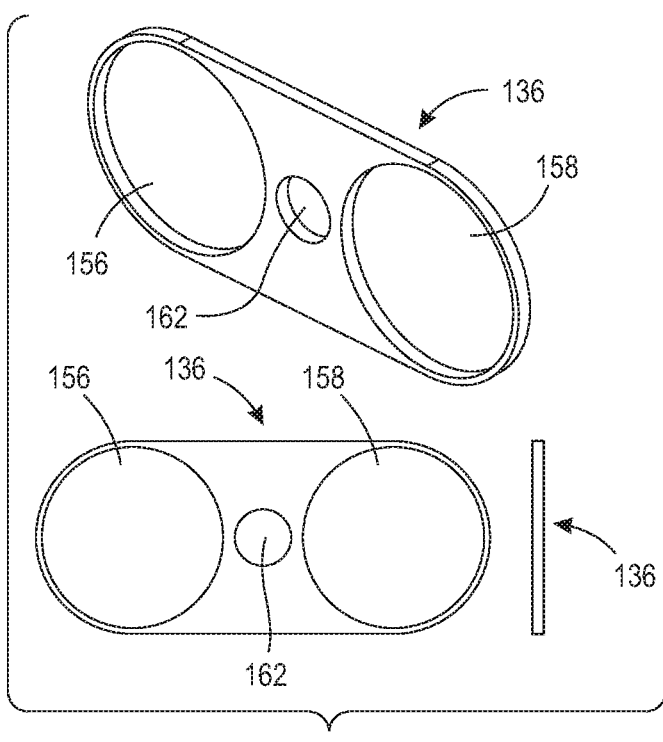
FIG. 4 is a front perspective, a side elevational and a front elevational view of an embodiment of a plate included in some embodiments of a present force damper.
Figure 5:
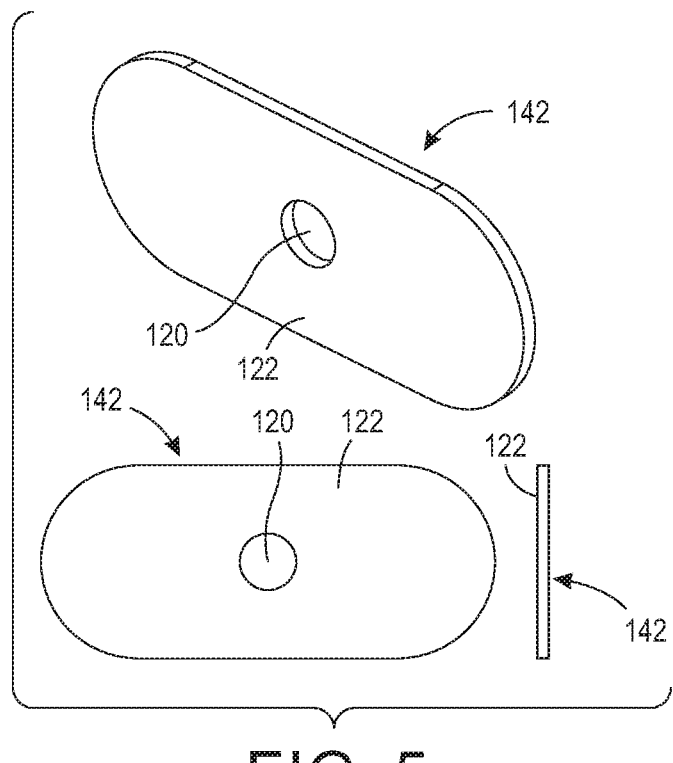
FIG. 5 is a front perspective, a side elevational and a front elevational view of an embodiment of a plate included in some embodiments of a present force damper.
Figure 6:
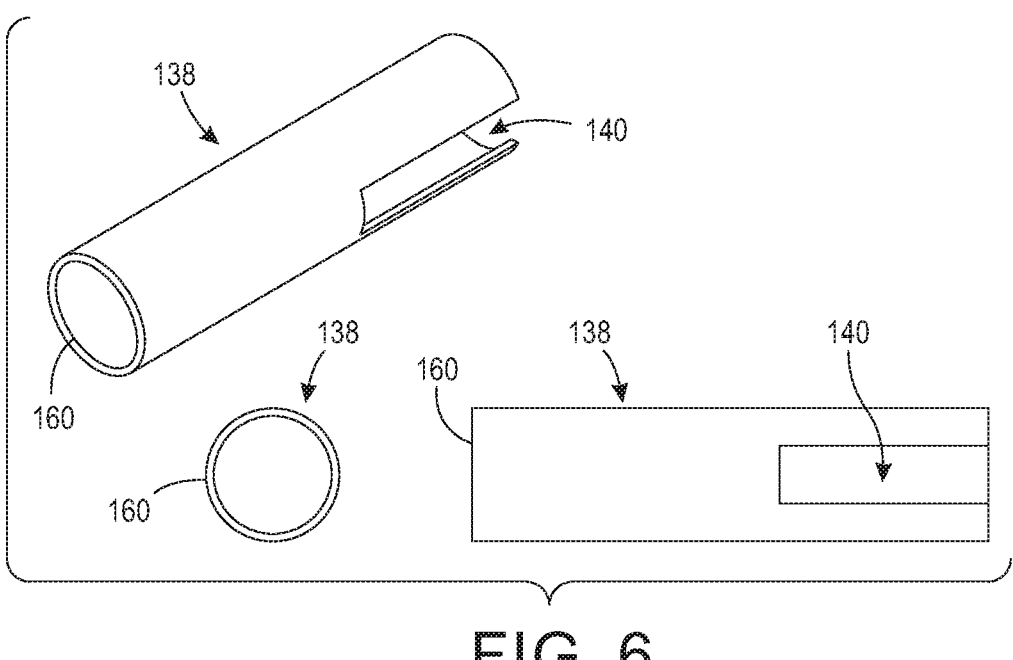
FIG. 6 is a front perspective, a side elevational and a front elevational view of an embodiment of a tube included in some embodiments of a present force damper.
Figure 7:
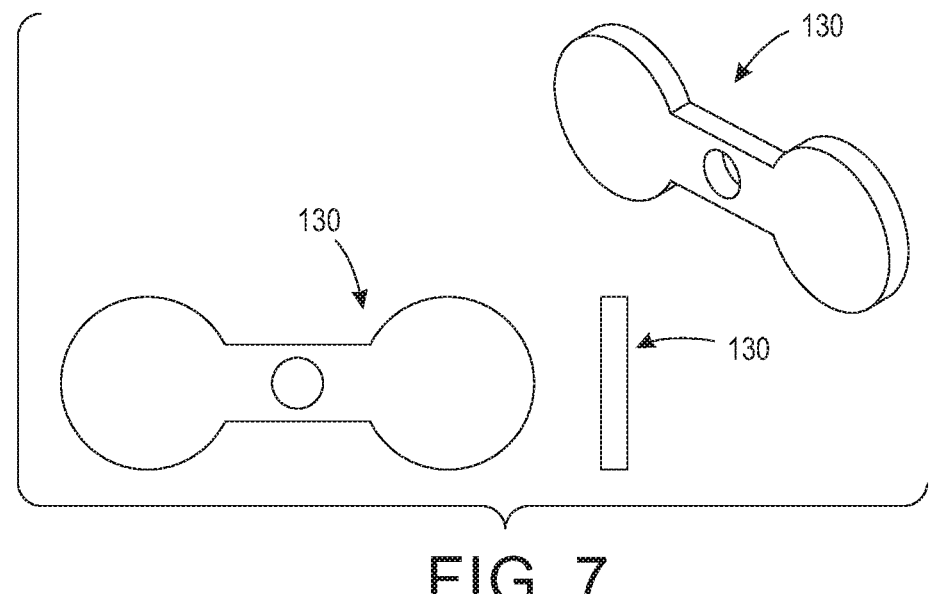
FIG. 7 is a front perspective, a side elevational and a front elevational view of an embodiment of a stop included in some embodiments of a present force damper.
Figure 8:
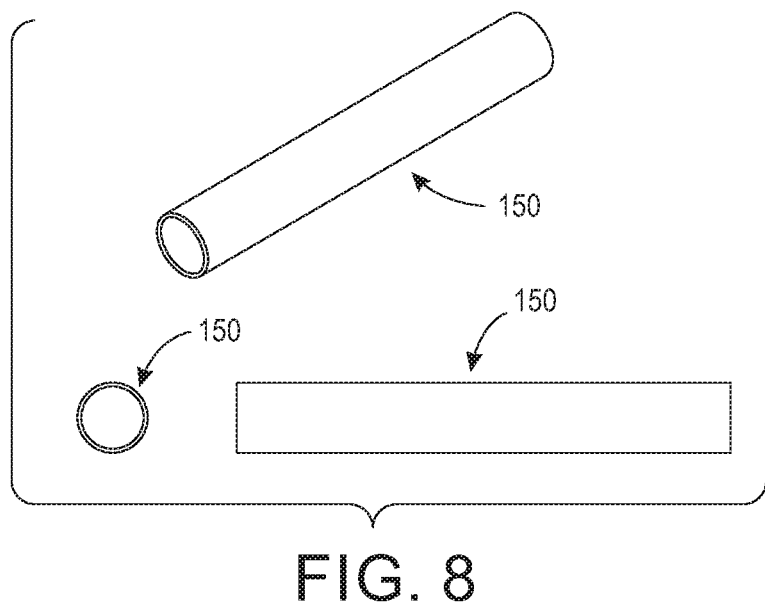
FIG. 8 is a front perspective, a side elevational and a front elevational view of an embodiment of a tube included in some embodiments of a present force damper.
Figure 9:
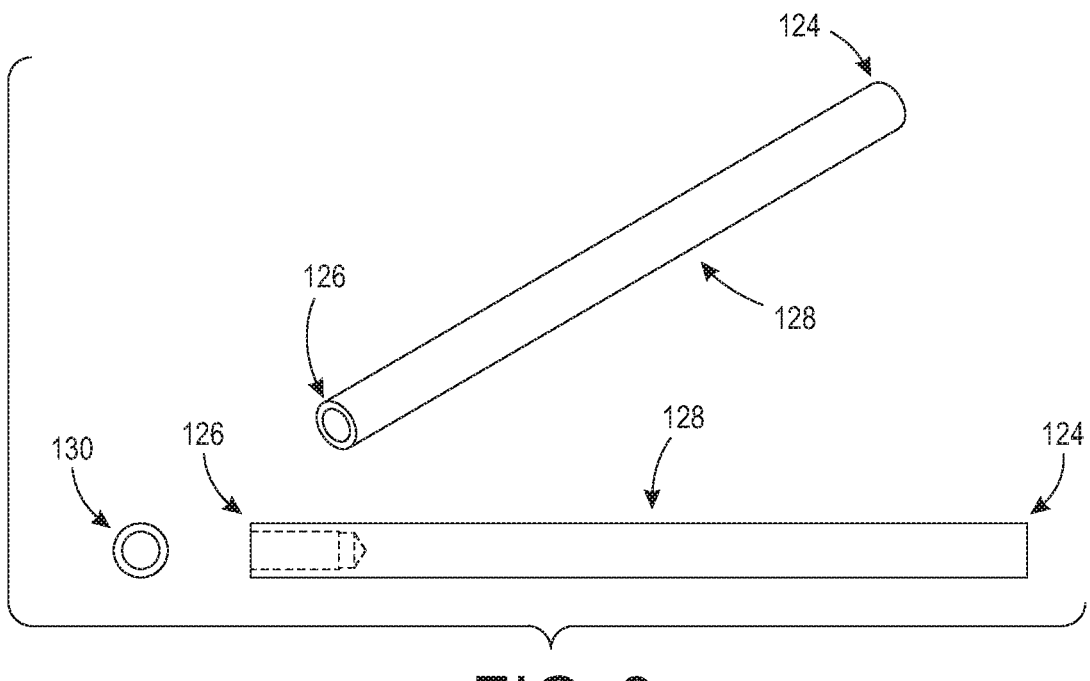
FIG. 9 is a front perspective, a side elevational and a front elevational view of an embodiment of a shaft included in some embodiments of a present force damper.
Figure 10:
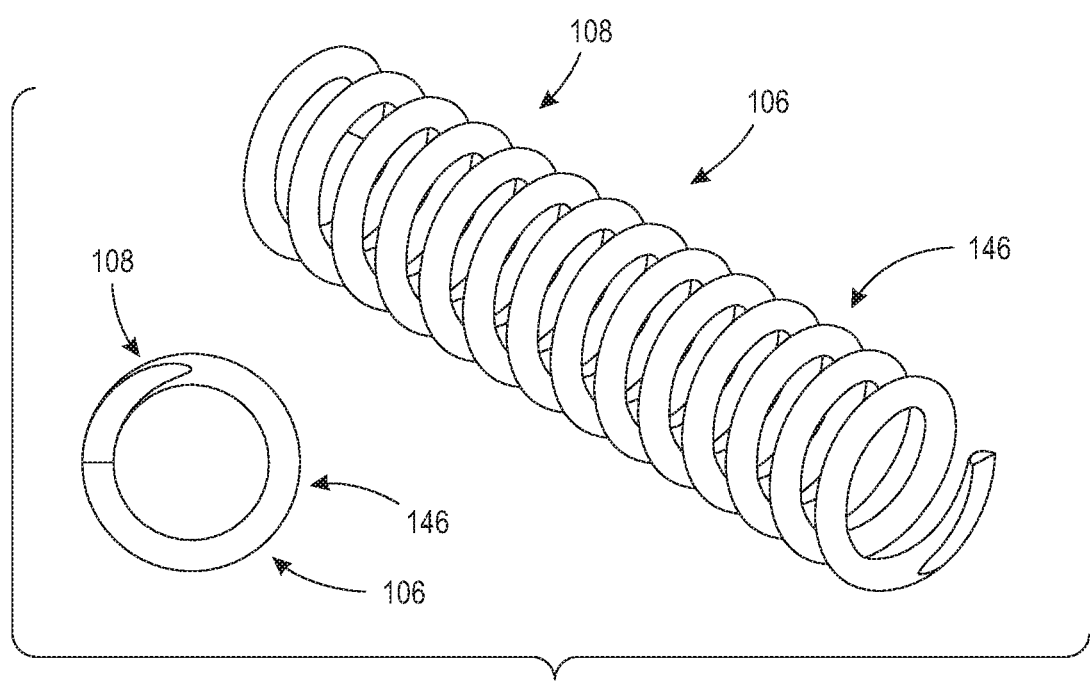
FIG. 10 is a front perspective and a front elevational view of an embodiment of a resilient member included in some embodiments of a present force damper.
Figure 11:
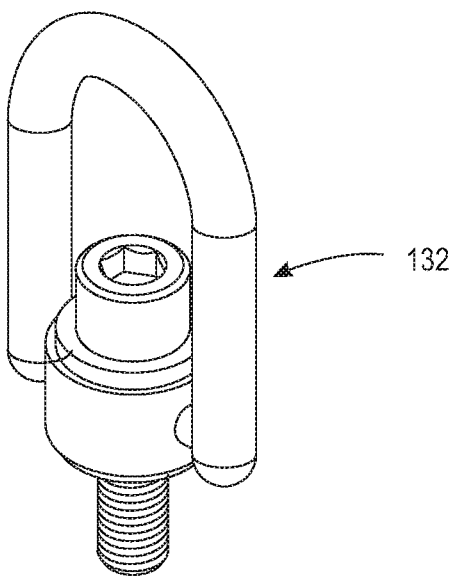
FIG. 11 is a front perspective view of an embodiment of a connection point included in some embodiments of a present force damper.
Figure 12:
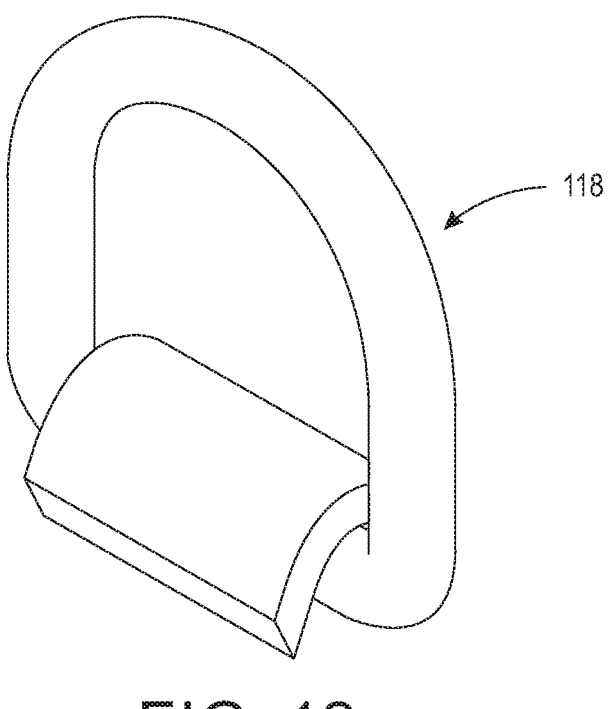
FIG. 12 is a front perspective view of an embodiment of a connection point included in some embodiments of a present force damper.
Figure 13:
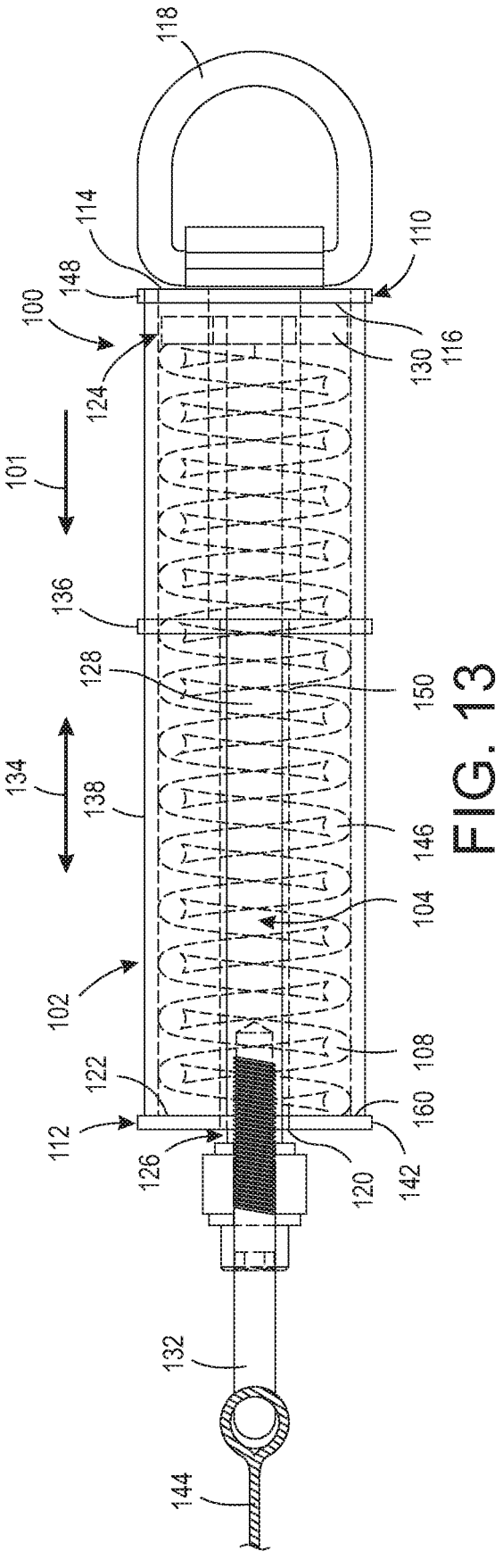
FIG. 13 is a side cross sectional view of an embodiment of a present force damper.
Figure 14:
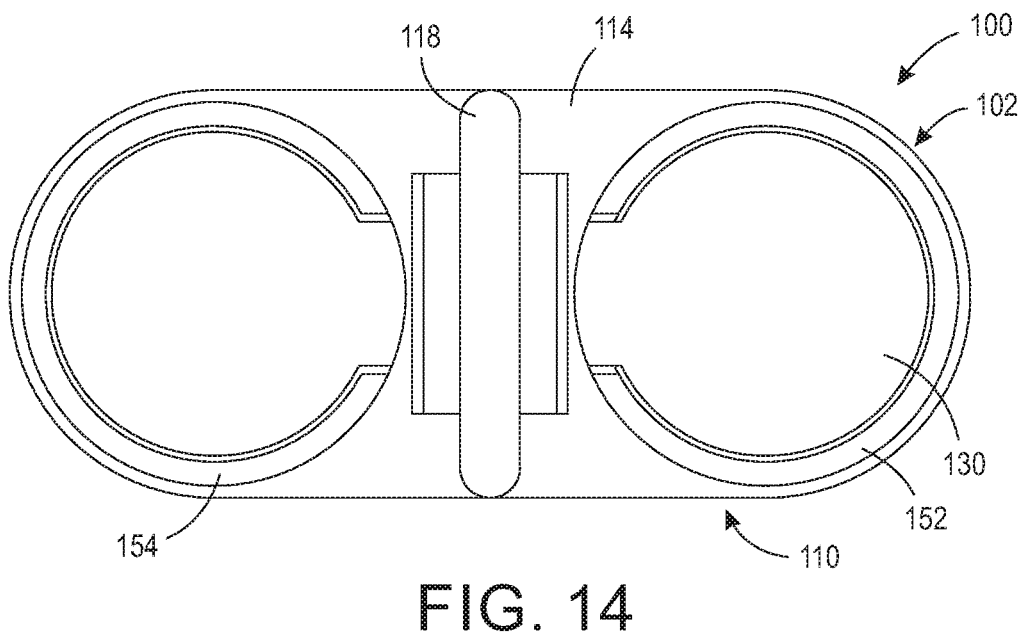
FIG. 14 is a front elevational view of an embodiment of a present force damper.
Figure 15:
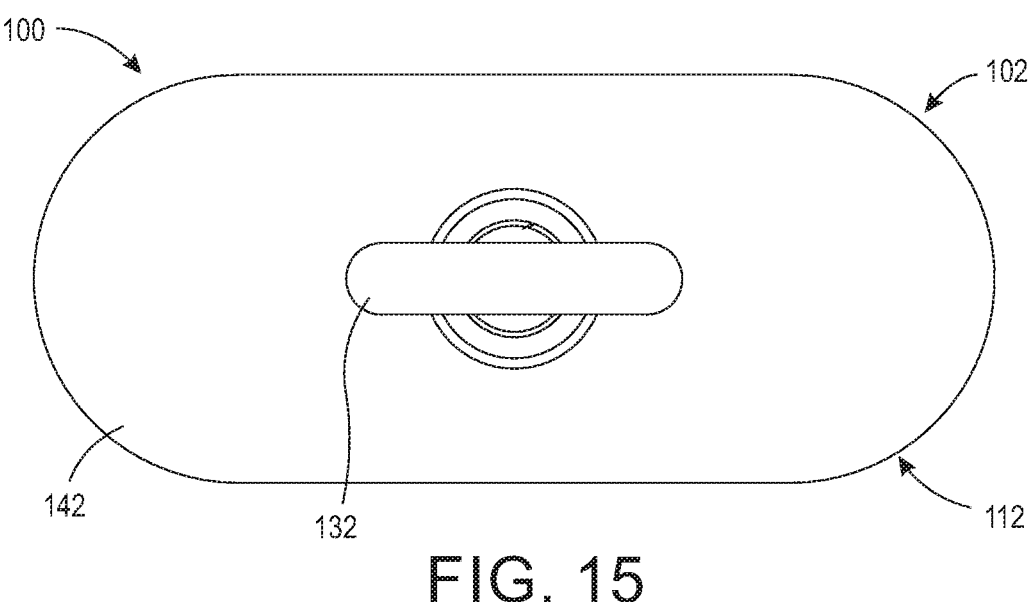
FIG. 15 is a back elevational view of an embodiment of a present force damper; and, FIG. 16 is a top perspective view of an embodiment of a present force damper.
Figure 16:
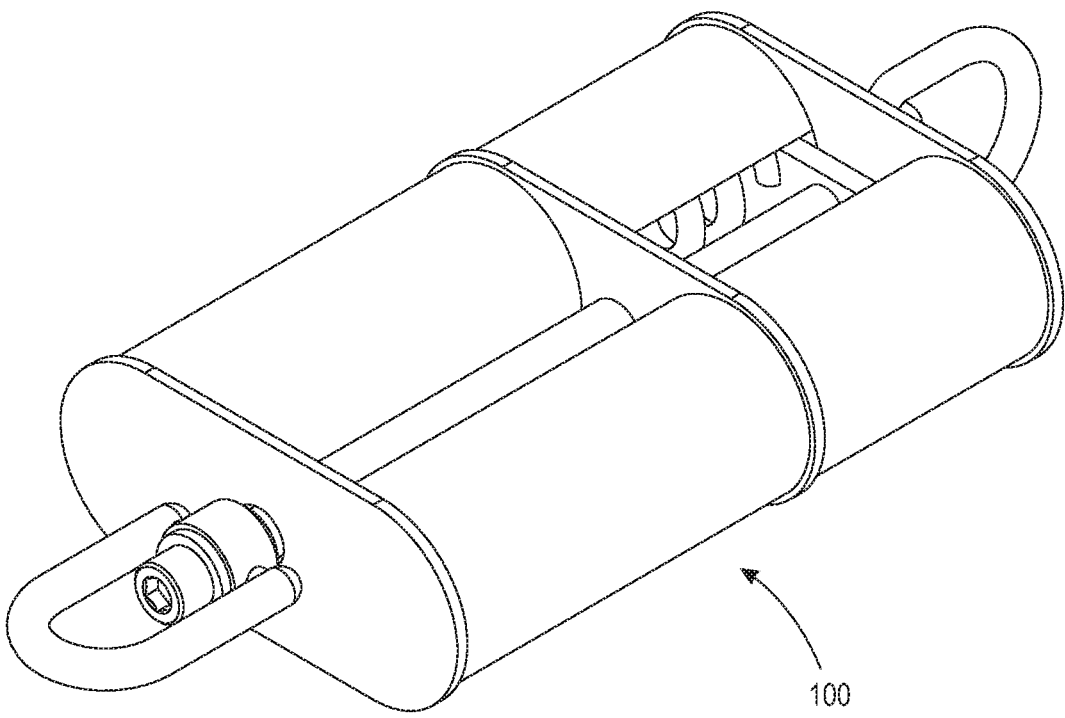

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodologies, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "substantially" is synonymous with terms such as "nearly," "very nearly," "about," "approximately," "around," "bordering on," "close to," "essentially," "in the neighborhood of" "in the vicinity of" etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. Additionally, "plastic deformation" is intended to mean instances when a sufficient load is applied to a material that causes a permanent change in shape to that material.

Adverting now to the figures, it should be appreciated that the figures depict various embodiments of the present force damper. The elevated work surface, e.g., roof, the falling object, e.g., a worker, a tool, a container filled with materials, etc., are not shown in the figures. One of ordinary skill in the art will readily appreciate the type, form and arrangement of each of the foregoing structures and therefore depiction in the figures is unnecessary. For the purpose of clarity in the detailed description, these structures are not included in the figures; however, the structures are discussed herebelow.

The present invention broadly includes force damper 50 arranged to progressively arrest a first force imparted by an object moving in a first direction, i.e., the direction depicted by arrow 51. Force damper 50 comprises housing 52, driving member 54 and resilient member 56. Housing 52 comprises first end 58 and second end 60. First end 58 includes first surface 62, second surface 64 opposite first surface 62 and first connection point 66 secured to first surface 62. Second end 60 includes through bore 68 and third surface 70 opposingly disposed relative to second surface 64. Driving member 54 comprises first end 72, a second end 74 and shaft 76 therebetween. First end 72 comprises stop 78 and second end 74 comprises second connection point 80. Resilient member 56 is formed from a material that at least partially undergoes plastic deformation when the first force is arrested. Resilient member 56 is disposed between stop 78 and third surface 70, and imparts a second force on stop 78 toward second surface 64 and on second end 60 toward third surface 70, as depicted by bi-directional arrow 82.

In some embodiments, housing 52 encloses resilient member 56. In some embodiments, second end 60 of housing 52 comprises block 84. Block 84 comprises through bore 68 and third surface 70. In some of these embodiments, block 84 is formed from a urethane material. Thus, block 84 may provide force damping in addition to that of resilient member 56. It should be appreciated that block 84 may also be formed from a rigid material, e.g., a metal, and in those embodiments block 84 does not provide additional force damping.

In some embodiments, resilient member 56 is a resilient polymer, a leaf spring, a shock absorber, and/or a compression spring, e.g., compression spring 86. In some of these embodiments, resilient member 56 is compression spring 86, and in some of these embodiments, compression spring 86 is formed from a chrome silicon steel material.

In some embodiments, force damper 50 further comprises securing line 88 selected from the group of: a rope, a cable, and/or a tether, and securing line 88 may in turn be connected to a harness and/or a belt. Subsequently, the object to be secured, e.g., a worker, a tool, a container, etc., is secured directly to the rope, cable and/or tether, or alternatively, secured directly to the harness and/or belt. It should be appreciated that securing line 88 is depicted as a rope only and that the structure and form of a cable and/or a tether are readily apparent to one having ordinary skill in the art and therefore depiction in the figures is unnecessary. Similarly, depiction of a subsequent harness and/or belt is also unnec- essary. It should be further appreciated that various types of securing lines are more suitable for the present force damper, e.g., stretchable and/or shock absorbing ropes, as additional force may be damped by these types of securing lines. However, including such types of securing lines is not required.

In other embodiments, the present invention broadly includes force damper 100 arranged to progressively arrest a first force imparted by an object moving in a first direction, i.e., the direction depicted by arrow 101. Force damper 100 comprises housing 102, driving member 104 and first and second resilient members 106 and 108, respectively. Housing 102 comprises first end 110 and second end 112. First end 110 includes first surface 114, second surface 116 opposite first surface 114 and first connection point 118 secured to first surface 114. Second end 112 includes through bore 120 and third surface 122 opposingly disposed relative to second surface 116. Driving member 104 comprises first end 124, second end 126 and shaft 128 therebe- tween. First end 124 comprises stop 130 and second end 126 comprises second connection point 132. At least one of first and second resilient members 106 and 108, respectively, is formed from a material that at least partially undergoes plastic deformation when the first force is arrested. In other terms, one or both of first and second resilient members 106 and 108, respectively, undergoes plastic deformation while arresting the first force. Thus, one of the resilient members may be arranged to arrest a portion of the force and display visible, permanent deformation while the other resilient member provides force damping while undergoing only elastic deformation, i.e., temporary shape change with res- toration to its original shape after damping is complete. First and second resilient members 106 and 108, respectively, are disposed between stop 130 and third surface 122, and impart a second force on stop 130 toward second surface 116 and on second end 112 toward third surface 122, as depicted by bi-directional arrow 134.

In some embodiments, housing 102 further comprises reinforcement plate 136 arranged between first and second ends 110 and 112, respectively, of housing 102. In some embodiments, housing 102 at least partially encloses first and second resilient members 106 and 108, respectively. It should be appreciated that "partially encloses" is depicted in the figures in that tubes 138 include open portions 140 which permit the linear actuation of stop 130 as force damper 100 arrests the first force imparted by the object moving in the first direction. In some embodiments, second end 112 of housing 102 comprises plate 142. Plate 142 comprises through bore 120. In some embodiments, force damper 100 further comprises securing line 144 selected from the group of: a rope, a cable, and/or a tether, and securing line 144 may in turn be connected to a harness and/or a belt. Subsequently, the object to be secured, e.g., a worker, a tool, a container, etc., is secured directly to the rope, cable and/or tether, or alternatively, secured directly to the harness and/or belt. It should be appreciated that securing line 144 is depicted as a rope only and that the structure and form of a cable and/or a tether are readily apparent to one having ordinary skill in the art and therefore depiction in the figures is unnecessary. Similarly, depiction of a subsequent harness and/or belt is also unnecessary. It should be further appreciated that vari- ous types of securing lines are more suitable for the present force damper, e.g., stretchable and/or shock absorbing ropes, as additional force may be damped by these types of securing lines. However, including such types of securing lines is not required.

In some embodiments, stop 130 extends perpendicularly from shaft 128 towards first and second resilient members 106 and 108, respectively. As such, it should be appreciated that stop 130 is positioned between first and second resilient members 106 and 108, respectively, and second surface 116.

In some embodiments, first and second resilient members 106 and 108, respectively, are formed from a resilient polymer, a leaf spring, a shock absorber, and/or a compres- sion spring, e.g., compression spring 146. In some of these embodiments, resilient members 106 and 108 are compres- sion spring 146, and in some of these embodiments, com- pression spring 146 is formed from a chrome silicon steel material.

Although the foregoing clearly sets forth the structure and function of various embodiments of the present force damper, a further description of the components of one of the embodiments may be helpful to further understand how the device functions. In various embodiments, force damper 100 may include a variety of additional components and such components are not required in all embodiments. However, it should be appreciated that it is possible to include all or some of the components described below in a single embodiment if desired.

In view of the foregoing, force damper 100 may include plate 148, reinforcement plate 136, plate 142, tubes 138, stop 130, tube 150, shaft 128, resilient members 106 and 108, and connection points 118 and 132. When all of the foregoing components are included in force damper 100, the following non-limiting arrangement is just one of the pos- sibilities. Tubes 138 partially enclose resilient members 106 and 108. Tubes 138 are passed through openings 152 and 154 in plate 148 and subsequently through openings 156 and 158 in reinforcement plate 136 until ends 160 of tubes 138 abut plate 142. Connection point 118 is fixedly secured to plate 148. Stop 130, which is secured to end 124 of shaft 128, is positioned within openings 140 of tubes 138 and between resilient members 106 and 108 and plate 148. The foregoing arrangement permits the linear movement of stop 130 against resilient members 106 and 108 when force damper 100 is arresting a first force imparted by an object moving in a first direction. Reinforcement plate 136 may further include opening 162 wherein tube 150 is passed until it abuts plate 142. Tube 150 provides an unrestricted passage for shaft 128 during its linear displacement. Moreover, the combination of reinforcement plate 136, tube 150 and plate 142 strengthens the overall structure of force damper 100. Plate 142 may include through bore 120 adjacent to the abutment of tube 150. Through bore 120 provides access to second end 126 of shaft 128 and thereby a means to secure connection point 132 to shaft 128. As can be appreciated in view of the foregoing, the pathway of force through the device is: connection point 118 to plate 148 to tubes 138 to plate 142 to resilient members 106 and 108 to stop 130 to shaft 128 to connection point 132. It is this arrangement that permits the damping of force between connection points 118 and 132, in this particular embodiment.

The foregoing arrangement results in a force damper that solves problems presented by regulatory agencies and worker safety concerns, i.e., a force damper in a fall mitigation system should only be used one time. The foregoing embodiments provide force damping over a reduced range of travel, e.g., the present force damper travels approximately three to six inches while absorbing the force of a falling object. Heretofore, existing force damping systems required far greater distance to damp the force of a falling object, e.g., two and a half to three feet. It should be appreciated that the present force damper system may be configured to travel lesser or greater lengths depending on the needs of the system. All the various resilient members described above may provide some elastic deformation, the resilient members are selected for particular falling masses that will always impart plastic deformation on at least one of the resilient members while they arrest a first force imparted by an object moving in a first direction. For example, one set of resilient members may be rated for arresting the force created by a falling object ranging from 100 kilograms (kg) to 150 kg, while a different set of resilient members may be rated for falling objects ranging from 150 kg to 200 kg. It is critical that at least one of the resilient members experiences plastic deformation so that single use of each the devices can be ensured. The plastic deformation of at least one of the resilient members with no return to its original shape/size provides a readily observable characteristic of the present force damper that ensures a user of the device can determine if it has been previously used for its intended purpose, i.e., arresting the force created by an object moving in a first direction.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A force damper adapted for a single-use upon a first application of a first force imparted by an object moving in a first direction, the force damper arranged to progressively arrest the first force imparted by the object moving in the first direction, and arranged to allow ready observation that the force damper has been subjected to the first force, the force damper comprising:

a housing comprising a first end and a second end, the first end having a first surface, a second surface opposite the first surface, and a first connection point secured to the first surface, and the second end having a through bore and a third surface opposingly disposed relative to the second surface;

a driving member comprising a first driving member end, a second driving member end and a shaft therebetween, the first driving member end comprises a stop and the second driving member end comprises a second connection point; and, a resilient member disposed between the stop and the third surface that imparts a second force on the stop toward the second surface, the resilient member comprising a compression spring that is compressed when the first force is applied, wherein, the compression spring undergoes observable partial plastic deformation after the first application of the first force is applied and subsequently progressively arrests the object.

2. The force damper of claim 1 wherein the housing encloses the resilient member.

3. The force damper of claim 1 wherein the second end of the housing comprises a block, the block comprising the through bore and the third surface.

4. The force damper of claim 3 wherein the block is formed from a urethane.

5. The force damper of claim 1 wherein the compression spring is formed from a chrome silicon steel material.

6. The force damper of claim 1 further comprising a securing line connection point connecting at least one of: a rope, a cable, and a lanyard.

7. The force damper of claim 6, wherein the at least one of the rope, the cable, and the lanyard connects at least one of: a harness and a belt.

* * * * *